(12) United States Patent
Nakayama et al.

(10) Patent No.: US 10,680,225 B2
(45) Date of Patent: Jun. 9, 2020

(54) CONNECTION APPARATUS FOR CONNECTING BATTERY MODULE AND ELECTRONIC DEVICE, AND METHOD FOR MANUFACTURING INSULATING COVER

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Osamu Nakayama, Yokkaichi (JP); Koichiro Mochizuki, Yokkaichi (JP); Tetsuya Fujita, Yokkaichi (JP); Seishi Kimura, Yokkaichi (JP)

(73) Assignees: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka-Shi, Osaka (JP)

( * ) Notice: Subject to any disclaimer, the term of this patent is extended or adjusted under 35 U.S.C. 154(b) by 0 days.

(21) Appl. No.: 15/778,298

(22) PCT Filed: Oct. 18, 2016

(86) PCT No.: PCT/JP2016/080788
§ 371 (c)(1),
(2) Date: May 23, 2018

(87) PCT Pub. No.: WO2017/094374
PCT Pub. Date: Jun. 8, 2017

(65) Prior Publication Data
US 2018/0358600 A1    Dec. 13, 2018

(30) Foreign Application Priority Data

Dec. 3, 2015    (JP) .................................. 2015-236511

(51) Int. Cl.
*H01M 4/02* (2006.01)
*H01M 2/20* (2006.01)
(Continued)

(52) U.S. Cl.
CPC ............ *H01M 2/202* (2013.01); *H01M 2/06* (2013.01); *H01M 2/08* (2013.01); *H01M 2/1077* (2013.01);
(Continued)

(58) Field of Classification Search
CPC ........................................................ H01M 4/02
See application file for complete search history.

(56) References Cited

U.S. PATENT DOCUMENTS

| | | | |
|---|---|---|---|
| 3,961,988 A * | 6/1976 | Andreoff | H01M 2/043 429/175 |
| 2003/0108789 A1 | 6/2003 | Yamakawa et al. | |
| 2015/0228955 A1* | 8/2015 | Nakayama | H01M 2/043 429/121 |

FOREIGN PATENT DOCUMENTS

| | | |
|---|---|---|
| JP | 2009272234 A | 11/2009 |
| JP | 2015088267 A | 5/2015 |

OTHER PUBLICATIONS

International Search Report and Written Opinion for Application No. PCT/JP2016/080788 dated Jan. 10, 2017; 4 pages.

\* cited by examiner

*Primary Examiner* — Jacob B Marks
(74) *Attorney, Agent, or Firm* — Reising Ethington, P.C.

(57) ABSTRACT

A connection apparatus for connecting a battery module and an electronic device is for connecting a battery module in
(Continued)

which a plurality of electric cells are arranged in a line and are connected to each other, and an electronic device arranged on a side of the battery module. The connection apparatus includes: a connection bus bar in which a welding plate to be connected to a connection electrode in the battery module is provided at one end, and the other end portion to be connected to a connecting portion of the electronic device is provided at the other end; and an insulating cover that is made of a synthetic resin and is attached to a lower face of the connection bus bar.

3 Claims, 15 Drawing Sheets

(51) Int. Cl.
  *H01R 11/28* (2006.01)
  *H01M 2/06* (2006.01)
  *H01M 2/08* (2006.01)
  *H01M 2/10* (2006.01)
  *H01M 2/24* (2006.01)
  *H01M 2/30* (2006.01)
  *H01M 10/04* (2006.01)
  *H01R 4/70* (2006.01)
(52) U.S. Cl.
  CPC ............ *H01M 2/206* (2013.01); *H01M 2/24* (2013.01); *H01M 2/30* (2013.01); *H01M 10/0413* (2013.01); *H01R 11/288* (2013.01); *H01R 4/70* (2013.01)

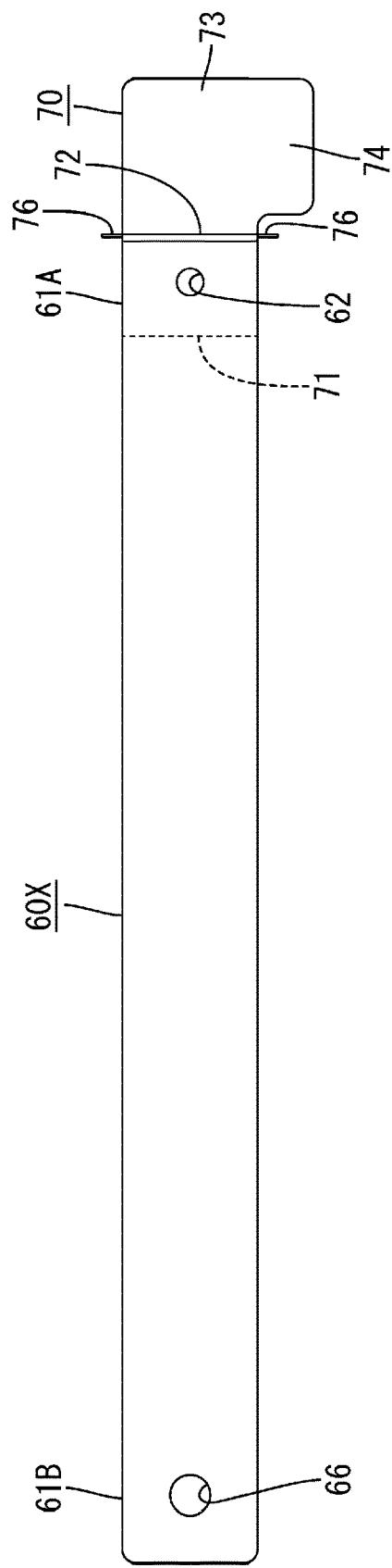

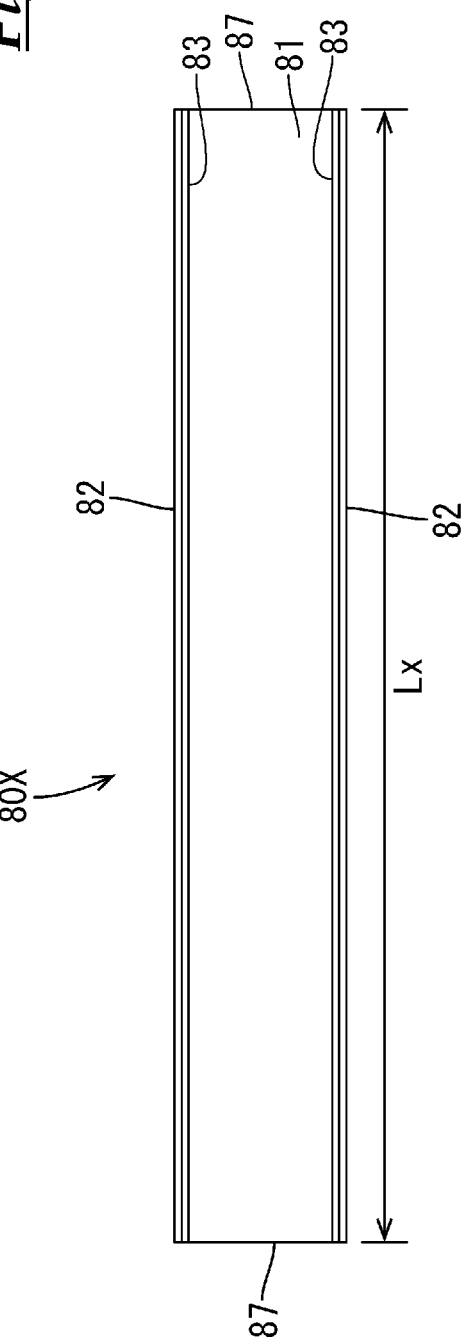

CONNECTION APPARATUS FOR CONNECTING BATTERY MODULE AND ELECTRONIC DEVICE, AND METHOD FOR MANUFACTURING INSULATING COVER

CROSS REFERENCE TO RELATED APPLICATIONS

This application claims the priority of Japanese patent application JP2015-236511 filed on Dec. 3, 2015, the entire contents of which are incorporated herein.

TECHNICAL FIELD

The technique disclosed in this specification relates to a connection apparatus for electrically connecting a battery module and another electronic device to each other.

BACKGROUND ART

Conventionally, a technique is known by which, when a battery module with a plurality of electric cells arranged in a line and connected to each other is electrically connected to another electronic device that is arranged on a side of the battery module, a connection bus bar is arranged to span an electrode at an end portion of the battery module and a connecting portion of the electronic device (see Patent Document 1 JP2004-95381A).

SUMMARY

Here, in some cases, a conductive member such as a wire harness or another electronic device is arranged in a space between the battery module and the electronic device, i.e. below the connection bus bar, and there is a concern that a short circuit may be made between the conductive member and the connection bus bar depending on the conditions or the like. There is a serious demand for measures for it.

The technique disclosed in this specification has been finished based on the foregoing situation.

A connection apparatus for connecting a battery module and an electronic device disclosed in this specification is a connection apparatus for connecting a battery module and an electronic device, the connection apparatus being for connecting a battery module in which a plurality of electric cells are arranged in a line and are connected to each other, and an electronic device arranged on a side of the battery module, the connection apparatus including: a connection bus bar in which a first connected portion to be connected to a connection electrode in the battery module is provided at one end, and a second connected portion to be connected to a connecting portion of the electronic device is provided at another end; and an insulating cover that is made of a synthetic resin and is attached to a lower face of the connection bus bar.

With this configuration, the lower face of the connection bus bar is insulated due to the insulating cover being attached thereto. In the case where a conductive member is arranged below the connection bus bar, a short circuit is prevented from being made between the connection bus bar and the conductive member.

The following configurations may also be employed.

The insulating cover includes a cover body that comes into contact with the lower face of the connection bus bar, and a locking portion that is provided at a side edge of the cover body so as to be elastically locked to a side edge of the connection bus bar.

Upon bringing the cover body of the insulating cover into contact with the lower face of the connection bus bar, the locking portion is elastically locked to the side edge of the connection bus bar, and the insulating cover is kept in an attached state. The insulating cover can be readily attached and detached.

Cut-off portions are provided at both ends of the insulating cover.

The insulating cover is formed by cutting off, into a predetermined length, a piece of extruded material that is formed by extruding a synthetic resin material, and accordingly, insulating covers of different lengths can be readily manufactured.

If the distance between the battery module and the electronic device is changed, the length of the connection bus bar is also changed accordingly, and then a variety of insulating covers of different lengths are required. Insulating covers of different lengths can be readily provided only by cutting off a piece of extruded material, as mentioned above.

The connection apparatus further includes: a first holding member that is insulative and is attached at a position at which the connection electrode is arranged in the battery module, while holding the first connected portion of the connection bus bar; and a second holding member that is insulative and is attached at a position at which the connecting portion is arranged in the electronic device, while holding the second connected portion of the connection bus bar, wherein the first holding member and the second holding member are provided with receiving portions for receiving one end and another end of the insulating cover, respectively.

The insulating cover is attached to the lower face of the connection bus bar so as to cover it, with both ends of the insulating cover received by the receiving portions of the first holding member and the second holding member.

A method for manufacturing an insulating cover disclosed in this specification is a method for manufacturing an insulating cover in a connection apparatus for connecting a battery module and an electronic device, the connection apparatus being for connecting a battery module in which a plurality of electric cells are arranged in a line and are connected to each other, and an electronic device arranged on a side of the battery module, and including a connection bus bar in which a first connected portion to be connected to a connection electrode in the battery module is provided at one end, and a second connected portion to be connected to a connecting portion of the electronic device is provided at another end, and an insulating cover that is made of a synthetic resin and is attached to a lower face of the connection bus bar, the method including: cutting off a piece of extruded material formed by extruding a synthetic resin material into a predetermined length and forming the insulating cover.

With the technique disclosed in this specification, it is possible to insulate the lower face side of the connection bus bar, and prevent a short circuit from being made between the connection bus bar and a conductive member arranged below the connection bus bar.

BRIEF DESCRIPTION OF DRAWINGS

FIG. 15 is a plan view of the connection bus bar that is applied to the example in which the separation distance is changed.

FIG. 16 is a plan view of the insulating cover that is applied to the example in which the separation distance is changed.

DESCRIPTION OF EMBODIMENTS

Embodiment

Figure 8:
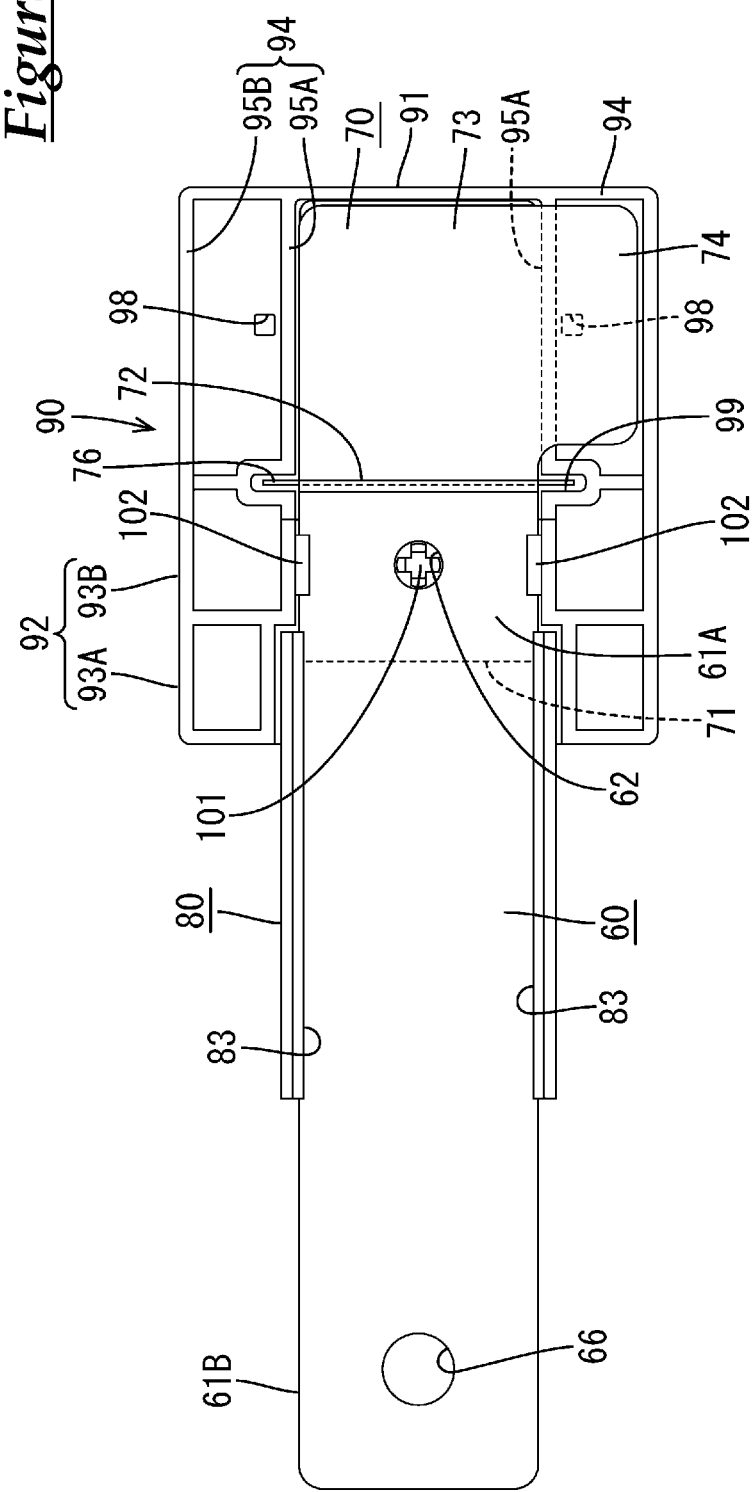
FIG. 8 is a plan view showing a state where the connection bus bar is attached to a first holding member.
Figure 9:
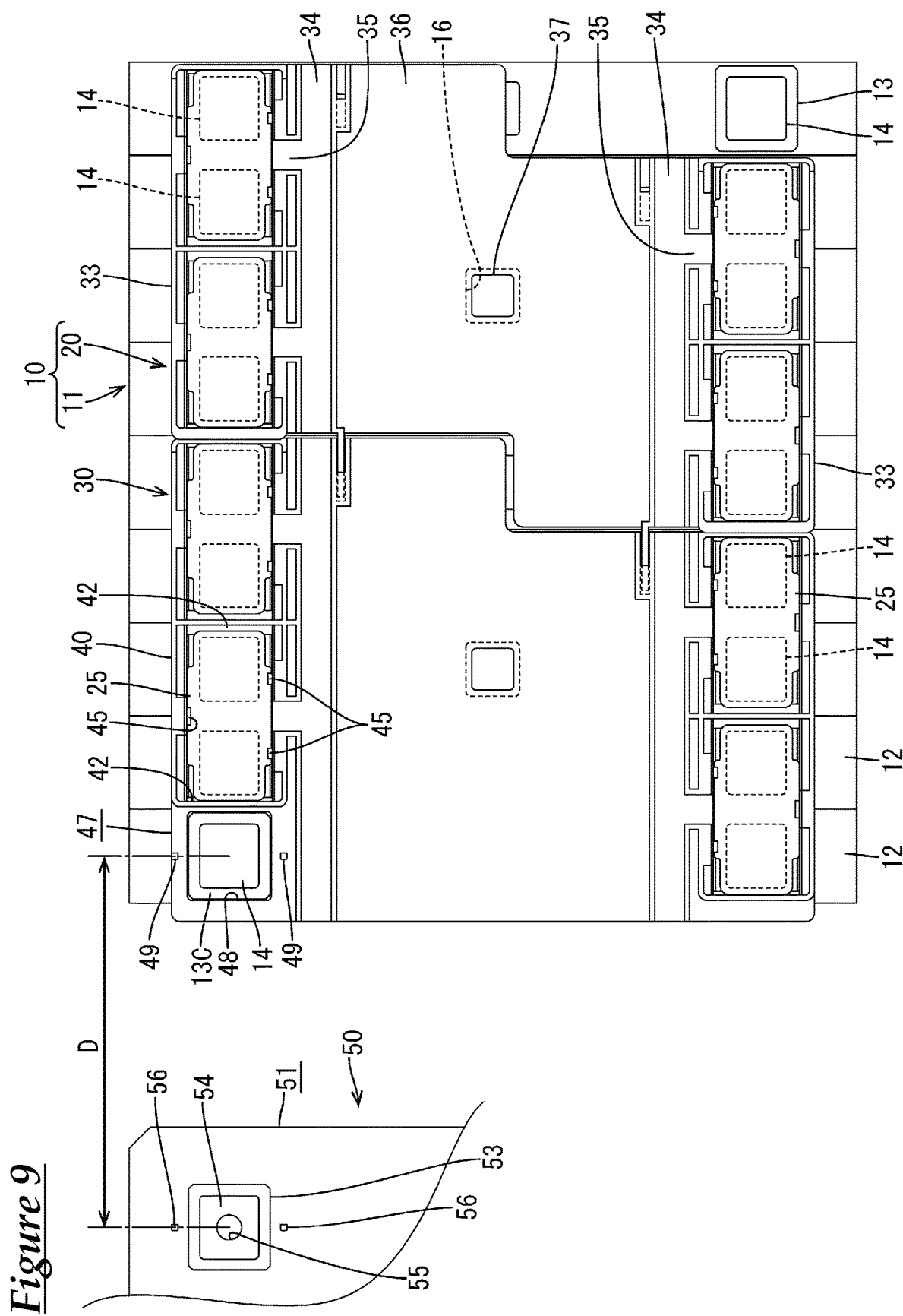
FIG. 9 is a plan view showing a state before the battery module and an electronic device are connected to each other.
Figure 10:
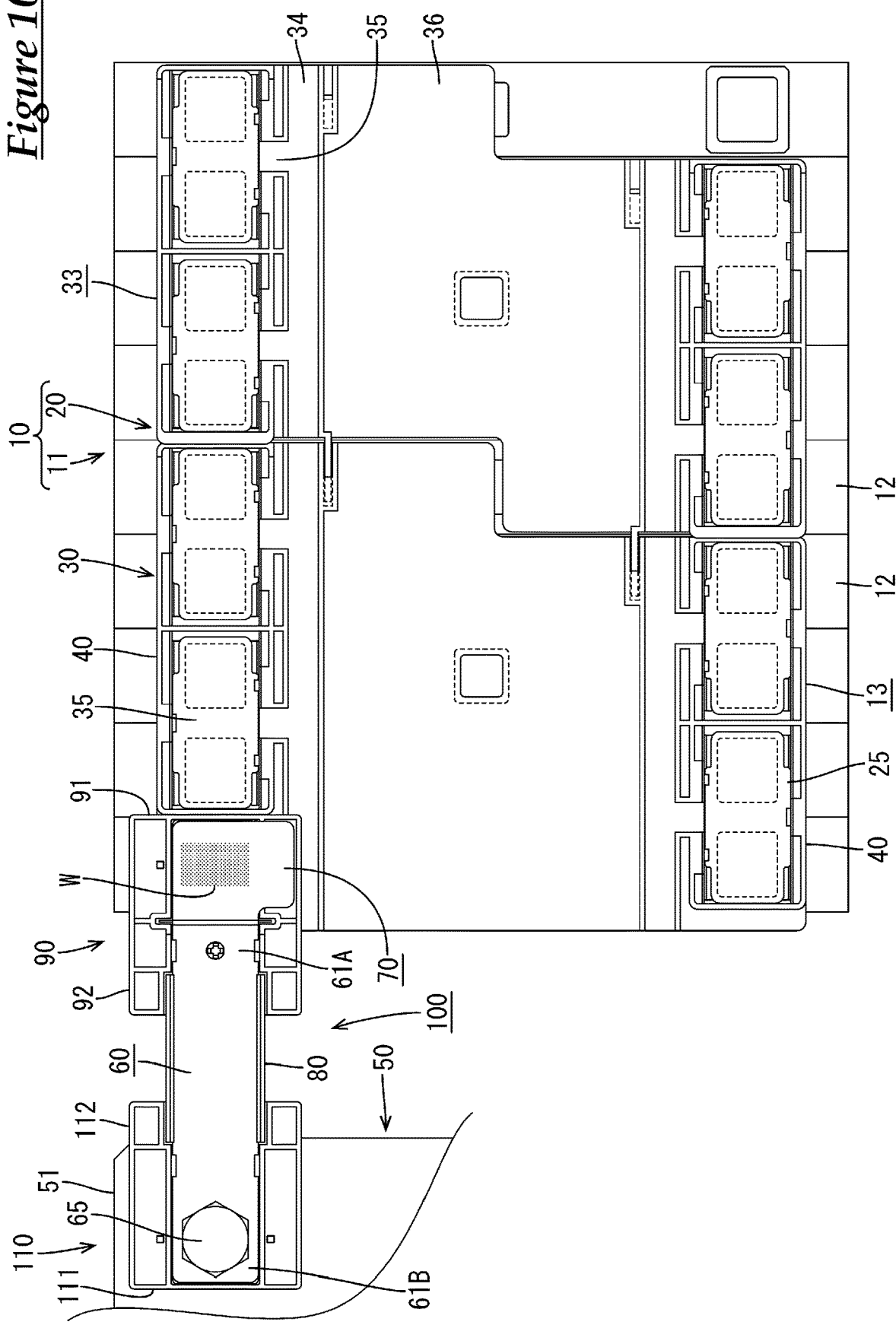
FIG. 10 is a plan view showing a state after connection.

An embodiment will be described with reference to FIGS. 1 to 16. As shown in FIG. 9, this embodiment describes an example of a case where the present apparatus is applied to a portion that electrically connects a battery module 10, which is mounted in a vehicle (not shown) such as an electric vehicle or a hybrid vehicle and is used as a power source for driving the vehicle, and an electronic device 50 such as an inverter that is arranged on a side of the battery module 10.

Figure 1:
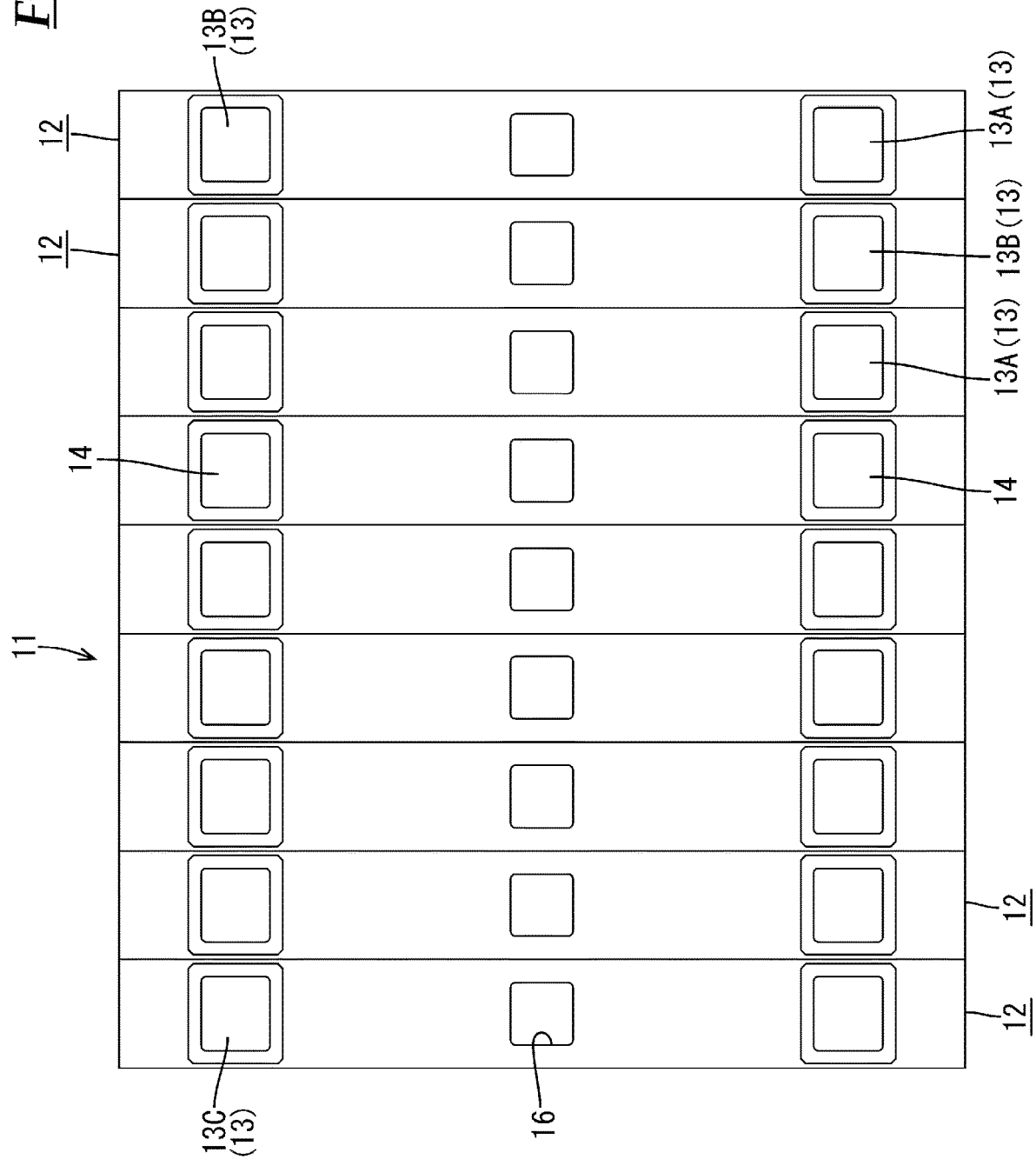
FIG. 1 is a plan view of an electric cell group according to an embodiment.

The battery module 10 is configured by attaching a wiring module 20 to an upper face of an electric cell group 11, as shown in FIG. 9, which is configured by arranging a plurality of (nine, in the example shown in the diagram) electric cells 12, as shown in FIG. 1.

Figure 12:
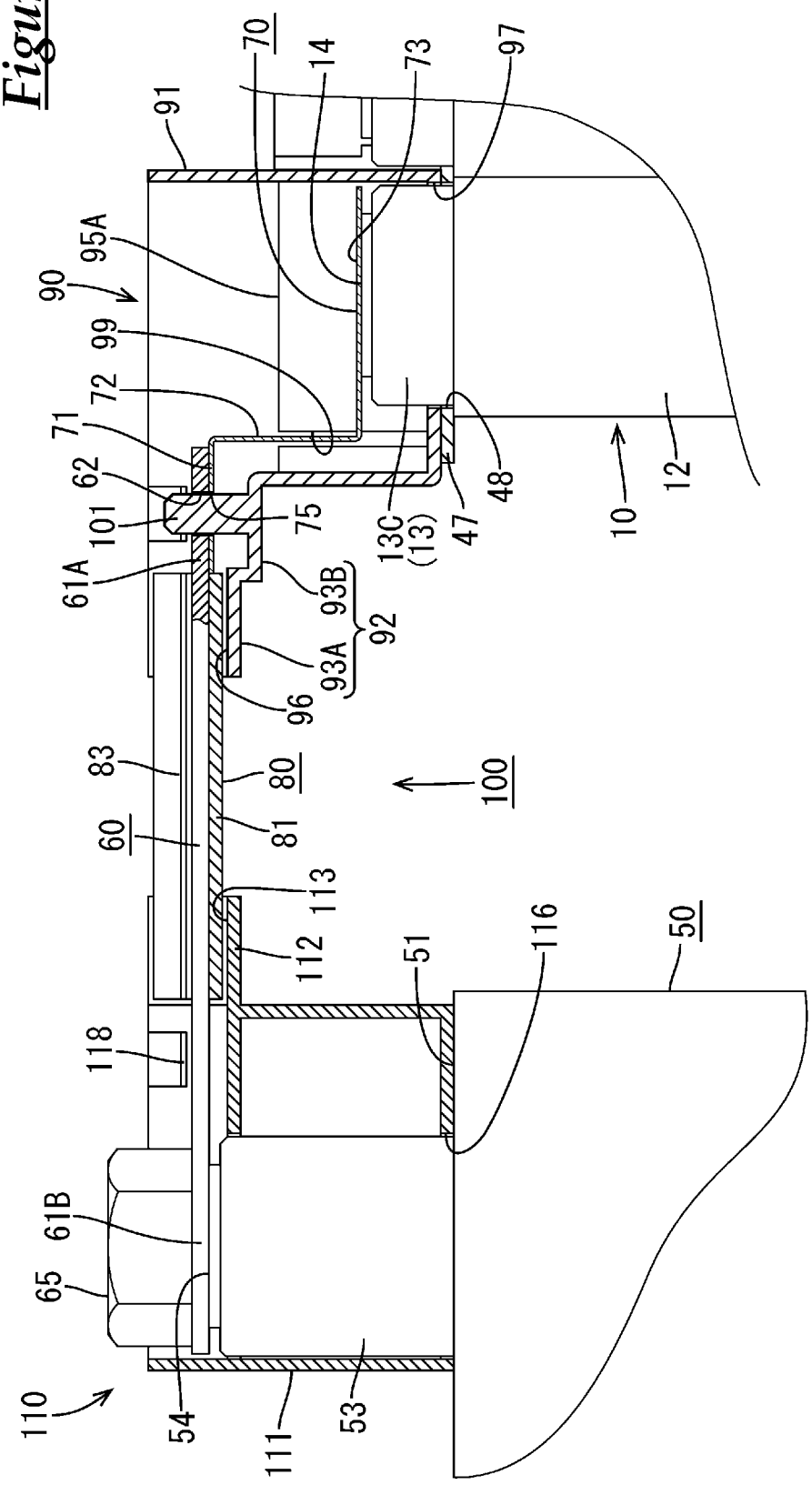
FIG. 12 is a cross-sectional view taken along a line XII-XII in FIG. 11.

As shown in FIG. 1, each electric cell 12 that constitutes the electric cell group 11 has a flat, rectangular parallelepiped shape, and a pair of electrode terminals 13 are arranged on each electric cell 12 at positions close to respective ends in the length direction. One of the electrode terminals 13 is a positive terminal 13A, and the other one is a negative terminal 13B. Each electrode terminal 13 is made of metal, and protrudes to form a short, rectangular-cylindrical shape, as shown in FIG. 12. A contact face 14 is formed in a raised manner at a central portion of an upper face of each electrode terminal 13.

As shown in FIG. 1, the electric cells 12 are arranged so that two adjoining electric cells 12 are arranged with electrode terminals 13 having different polarities located next to each other, i.e. the positive terminal 13A of one electric cell 12 is located next to the negative terminal 13B of another electric cell 12 that is adjacent to the one electric cell 12.

A positioning recessed portion 16 having a rectangular shape, to which a positioning protruding portion 37 of a later-described insulating protector 30 is fitted, is provided between the pair of electrode terminals 13 on the upper face of each electric cell 12.

Here, one (upper one in FIG. 1) of the electrode terminals 13 of an electric cell 12 that is arranged at an end portion in the electric cell group 11 serves as a connection electrode 13C that is to be connected to the electronic device 50.

The wiring module 20 includes the insulating protector 30 (see FIG. 2), which is made of a synthetic resin, an inter-electrode connection bus bar 25 (hereinafter, simply "bus bar 25"), which is held by the insulating protector 30 and connects the positive terminal 13A and the negative terminal 13B of adjoining electric cells 12, a voltage detection terminal (not shown), which is arranged overlapping the bus bar 25 to be electrically connected thereto, and so on.

Figure 3:
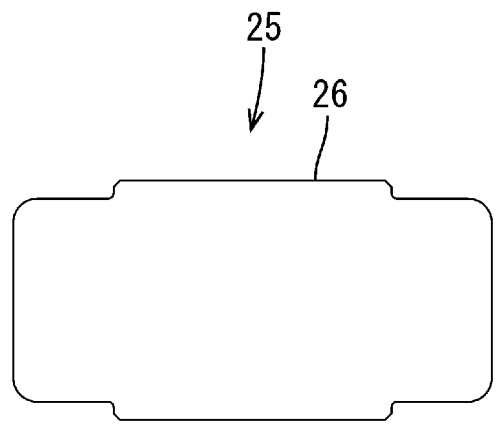
FIG. 3 is a plan view of a bus bar.

The bus bar 25 is formed by pressing a metallic plate, and forms a substantially rectangular shape when seen in a plan view, as shown in FIG. 3. A large-width portion 26 is formed in a central portion of the bus bar 25 in the length direction, and the voltage detection terminal overlaps and is fixed to this large-width portion 26.

Figure 2:
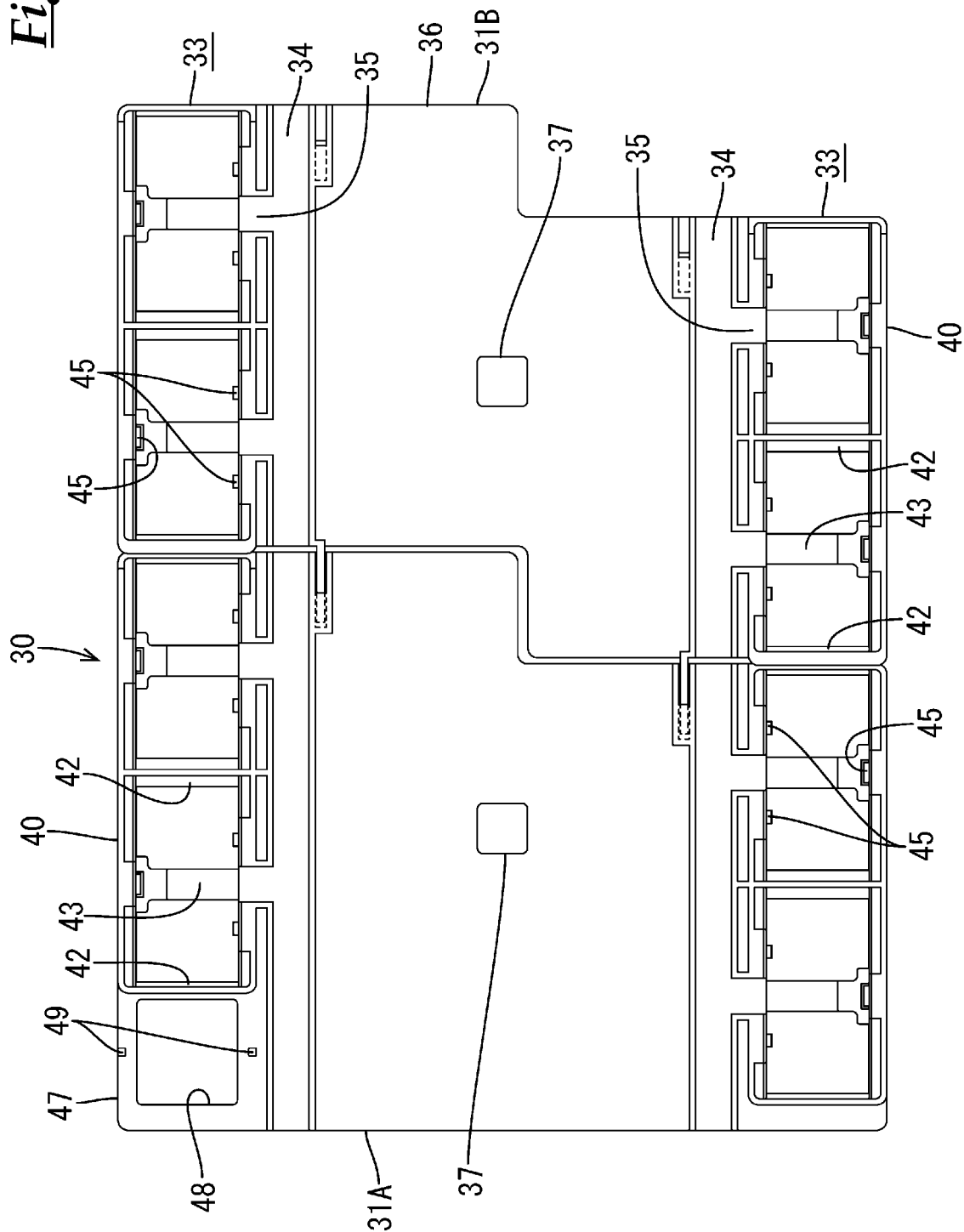
FIG. 2 is a plan view of a resin protector.

As shown in FIG. 2, the insulating protector 30 is configured by joining two unit protectors 31A and 31B to each other.

In an overall structure of the insulating protector 30, a pair of bus bar holding portions 33 are formed along both side edges in the width direction (upper and lower side edges in the diagram), and a pair of wire accommodating grooves 34 are formed inward of the respective bus bar holding portions 33 (central side in the width direction). A structure is employed in which the bus bar holding portions 33 include four rectangular-cylindrical accommodating walls 40, which can accommodate a bus bar 25 and two adjoining electrode terminals 13 from above and below, and are arranged in the length direction. Each pair of bus bar holding portions 33 are arranged shifted in the length direction by the size of one electrode terminal 13.

A substrate 36, which has a flat plate shape, is formed between the pair of wire accommodating grooves 34 so as to join lower faces of the wire accommodating grooves 34. Two positioning protruding portions 37, each having a rectangular shape that fits to a corresponding positioning recessed portion 16, are formed in the substrate 36 in a downward protruding manner at positions that correspond to the respective positioning recessed portions 16 of the electric cells 12, in a state where the insulating protector 30 has been attached to the electric cell group 11.

In each accommodating wall 40 that constitutes a bus bar holding portion 33, receiving portions 42 for receiving end edges of the bus bar 25 on the short sides are formed in opposing faces of both short walls, and a partition wall 43 is formed at the same height as the receiving portions 42 so as to span central portions of both long walls in the length direction. Elastic retaining pieces 45, which are elastically locked to end edges of the bus bar 25 on the long sides to retain the bus bar 25, are formed on opposing faces of both long walls. Note that a wire leading groove 35 for leading a detection wire (not shown) that is connected to the voltage detection terminal toward the wire accommodating groove 34 side is formed in a central portion, in the length direction, of the long wall that is adjacent to the wire accommodating groove 34.

The bus bar 25 is pushed in from above with the elastic retaining pieces 45 elastically deforming, while being guided by the corresponding accommodating wall 40. Upon the bus bar 25 having been pushed in until it abuts against the receiving portions 42 and the partition wall 43, the bus bar 25 is held so as not to come out upward due to elastic restoration of the elastic retaining pieces 45 (see FIG. 9). A back face of the bus bar 25 in areas between the respective receiving portions 42 and the partition wall 43 is exposed downward.

At an upper left corner portion of the insulating protector 30 (left unit protector 31A) in FIG. 2, a first placement portion 47, on which a first holding member 90 for holding an inter-component connection bus bar 60 (hereinafter, "connection bus bar 60), details of which will be described later, is placed, is formed flush with the substrate 36. An electrode insertion hole 48, into which the connection electrode 13C of the aforementioned electric cell 12 at the end portion is inserted from below substantially tightly, is formed in the first placement portion 47. A pair of positioning pins 49 are arranged standing upright on both upper and lower sides of the electrode insertion hole 48 in the diagram.

The battery module 10 is assembled as follows, for example. First, the wiring module 20 is assembled. The bus bars 25 are accommodated and held by the bus bar holding portions 33 (accommodating walls 40) in the insulating protector 30. The voltage detection terminals (not shown) provided at terminals of the detection wires are fixed, by means of welding or the like, to upper faces of the large-width portions 26 of the respective bus bars 25, and the detection wires that have been pulled out are distributed from the wire leading grooves 35 along the wire accommodating grooves 34.

The thus-assembled wiring module 20 is attached to the upper face of the electric cell group 11, with the positioning protruding portions 37 fitted to the positioning recessed portions 16, as shown in FIG. 9. As a result, the electrode terminals 13 of the electric cells 12 enter the inside of the accommodating walls 40 from below, and the contact faces 14 come into contact with the lower faces of the bus bars 25. Then, the bus bars 25 and the electrode terminals 13 are welded to each other by means of laser welding in which the bus bars 25 are irradiated with a laser.

As a result of attaching the wiring module 20, the connection electrode 13C of a predetermined electric cell 12 passes through the electrode insertion hole 48 in the first placement portion 47 of the insulating protector 30, and protrudes upward of the electrode insertion hole 48 (see FIG. 12).

Assembly of the battery module 10 is thus completed, and this battery module 10 is installed at a predetermined position within the vehicle.

An electronic device 50 is arranged at a predetermined position on a side of the battery module 10, as shown in FIG. 9. A second placement portion 51 is set at a corner of an upper face of the electronic device 50, and a connecting portion 53 is arranged standing upright in the second placement portion 51. The connecting portion 53 of the electronic device 50 and the connection electrode 13C that is arranged standing upright on the predetermined electric cell 12 in the battery module 10 are electrically connected by the connection bus bar 60.

The connecting portion 53 of the electronic device 50 is made of metal. As shown in FIG. 12, the connecting portion 53 is provided protruding in a rectangular-cylindrical shape and is one size larger than the electrode terminal 13 of the aforementioned electric cell 12. A fastening face 54 is formed in a central portion of the upper face of the connecting portion 53 at a position higher than the upper face. A bolt hole 55 is formed in the fastening face 54.

A pair of positioning pins 56 that facilitate the positioning of a later-described second holding member 110 are arranged standing upright on both sides of the connecting portion 53 in the up-down direction in FIG. 9.

The connecting portion 53 of the electronic device 50 is located on an extension line in the direction in which the electrode terminals 13 are arranged on one side (upper side in FIG. 1) of the electric cell group 11. As shown in FIG. 12, the fastening face 54 of the connecting portion 53 is set so as to be located at a position higher than the contact face 14 of the connection electrode 13C of the aforementioned electric cell 12 by a predetermined height.

Here, as shown in FIG. 9, the separation distance between the connection electrode 13C in the battery module 10 and the connecting portion 53 of the electronic device 50 on a horizontal plane is set to "D" (which will be referred to as "separation distance D between the battery module 10 and the electronic device 50" below).

Figure 4:
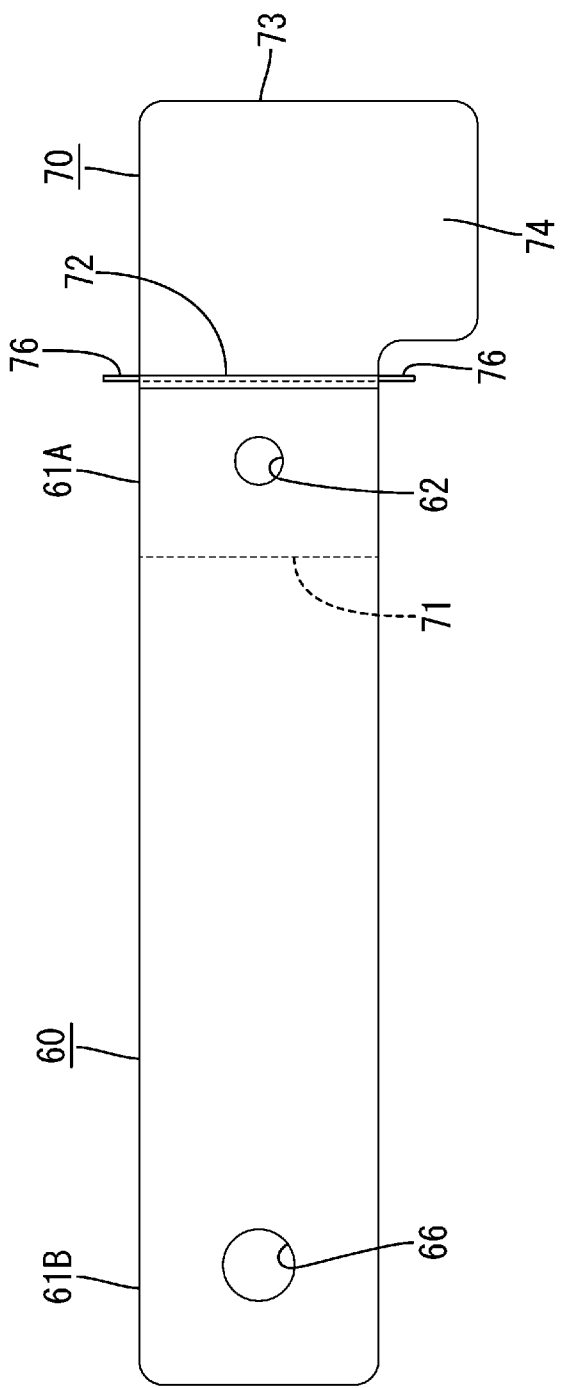
FIG. 4 is a plan view of a connection bus bar.
Figure 5:
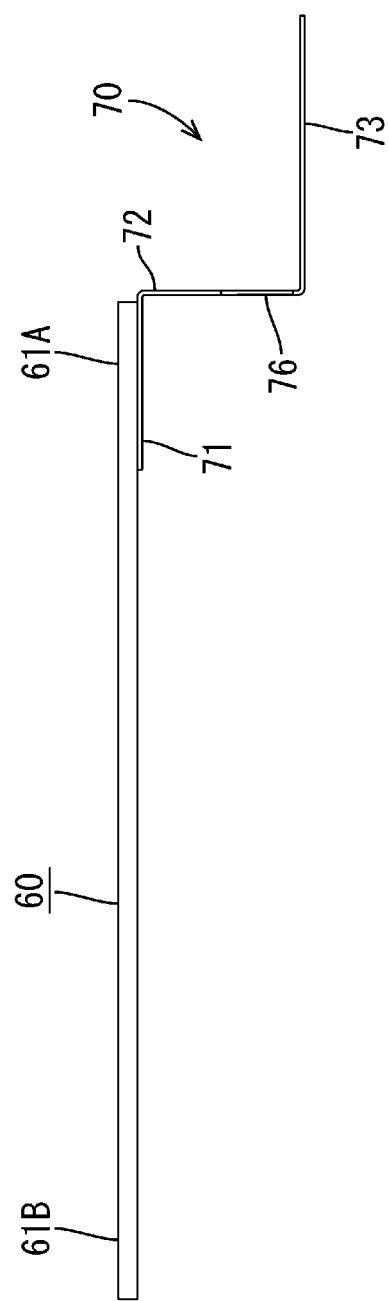
FIG. 5 is a front elevational view of the connection bus bar.

The connection bus bar 60 is formed by pressing a metal plate, and is formed to have a band shape having a predetermined length slightly shorter than the separation distance D between the battery module 10 and the electronic device 50, as shown in FIGS. 4 and 5.

As will be described later in detail, a welding plate 70 (which corresponds to "first connected portion"), which is to be connected to the connection electrode 13C in the battery module 10 (electric cell 12) by means of welding, is provided at one end portion 61A (right end portion in FIG. 4) of the connection bus bar 60. Meanwhile, the other end portion 61B (which corresponds to "second connected portion") of the connection bus bar 60 is to be fastened to the connecting portion 53 of the electronic device 50, and a bolt insertion hole 66, into which a bolt 65 is to be inserted, is open in the other end portion 61B of the connection bus bar 60. Note that a positioning hole 62, which is a round hole, is open at the one end portion 61A of the connection bus bar 60.

The welding plate 70 provided at the one end portion 61A of the connection bus bar 60 is formed by pressing a metal plate, which is thinner than the connection bus bar 60, into a predetermined shape.

Specifically, the welding plate 70 has an attachment face 71, which is to be brought into contact with a back face of the one end portion 61A of the connection bus bar 60, a vertically downward face 72, which is formed by bending a leading end edge of the attachment face 71 downward at a right angle, and a welding face 73, which is formed by bending a lower edge of the vertically downward face 72 forward (rightward in FIG. 5) at a right angle, and the welding plate 70 is formed to have a crank shape (or an L-shape if the attachment face 71 is removed), as shown in FIG. 5. As mentioned above, the welding plate 70 is formed to have an substantially L-shape in view of the size difference in the height direction between the fastening face 54 of the connecting portion 53 of the electronic device 50 and the contact face 14 of the connection electrode 13C in the electric cell 12. For this reason, the height of the vertically downward face 72 is set corresponding to the aforementioned size difference in the height difference.

As shown in FIG. 4, the attachment face 71 and the vertically downward face 72 of the welding plate 70 have the same width as the connection bus bar 60, and the welding face 73 protrudes at an edge on one side (lower edge in FIG. 4) and has an increased width. The protruding portion of the welding face 73 is used as a pressing portion 74 that is to be pressed by a jig. A positioning hole 75 (see FIG. 12), which is aligned with the positioning hole 62 in the connection bus bar 60, is formed in the attachment face 71. A pair of guide pieces 76 are formed to protrude from left and right vertical edges of the vertically downward face 72.

The attachment face 71 of the welding plate 70 is brought into contact with the back face of the one end portion 61A of the connecting bus bar 60, with the positioning holes 75 and 62 aligned with each other, and is firmly attached thereto by means of ultrasonic welding. Accordingly, settings have been made so that, when the other end portion 61B of the connection bus bar 60 is placed on the fastening face 54 of the connecting portion 53 of the electronic device 50, the welding face 73 of the welding plate 70 comes into contact with the contact face 14 of the connection electrode 13C of the electric cell 12, as shown in FIG. 12.

Figure 6:
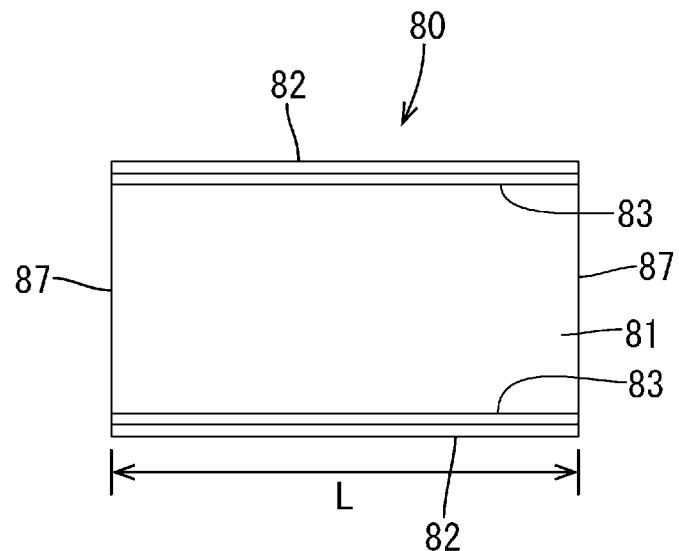
FIG. 6 is a plan view of an insulating cover.

An insulating cover 80, which is made of a synthetic resin, is attached to a lower face of the connection bus bar 60. More specifically, the insulating cover 80 has a predetermined length L that enables the insulating cover 80 to cover a central length region excluding predetermined regions on one end side and another end side of the connection bus bar 60, as shown in FIGS. 6 and 8.

Figure 7:
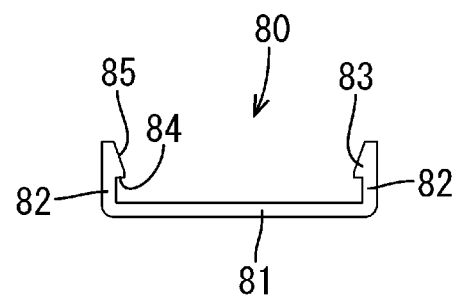
FIG. 7 is a side view of the insulating cover.

Also, as shown in FIG. 7, the insulating cover 80 is formed to have a substantially channel shape that has a bottom wall 81, which comes into contact with the lower face of the connection bus bar 60 over the entire width thereof, and side walls 82, which stand from both side edges of the bottom wall 81. Pawl portions 83, which are to be locked to side edges of an upper face of the connection bus bar 60, are formed in opposing faces of raised end portions of the side walls 82. Specifically, lower ends of the pawl portions 83 stand perpendicularly and serve as locking faces 84, and tapered guide faces 85 are formed on the upper side of the pawl portions 83. Here, the bottom wall 81 of the insulating cover 80 corresponds to "cover body", and each side wall 82 that has a pawl portion 83 corresponds to "locking portion".

In the insulating cover 80 that has the above-described shape, an elongated extruded material, which is formed by extruding a synthetic resin material, is formed by being cut off into a predetermined length. In terms of structure, cut-off portions 87 are present at both ends of the insulating cover 80.

The insulating cover 80 is fitted to the lower face of the connection bus bar 60 while both side walls 82 are elastically deformed to assume an open shape. Upon the bottom wall 81 coming into contact with the lower face of the connection bus bar 60, both side walls 82 undergo restoring deformation and the pawl portions 83 are locked to side edges of the upper face of the connection bus bar 60. Thus, the insulating cover 80 is kept in a state of covering the lower face of the connection bus bar 60.

In addition, a first holding member 90, which can accommodate and hold the one end portion 61A, including the welding plate 70, of the aforementioned connection bus bar 60, and a second holding member 110, which can accommodate and hold the other end portion 61B of the connection bus bar 60, are provided. The first holding member 90 is made of a synthetic resin, and is formed to have a box shape that is to be placed on the aforementioned first placement portion 47 of the insulating protector 30 and is open substantially in its upper face, as shown in FIGS. 8 and 12. Specifically, the first holding member 90 is constituted by a body box portion 91, and a protruding portion 92, which is formed to protrude at an upper position on a face of the body box portion 91 on the side opposing the electronic device 50, as shown in FIG. 12. Left and right side walls of the first holding member 90 are each constituted by a double wall portion 94, which includes an inner wall 95A and an outer wall 95B, as shown in FIG. 8.

The aforementioned protruding portion 92 is further divided into a front protruding portion 93A and a rear protruding portion 93B, and is formed to have a stepped shape in which a bottom face of the front protruding portion 93A is located slightly higher than a bottom face of the rear protruding portion 93B. The bottom face of the front protruding portion 93A serves as a first receiving portion 96 for receiving one end portion (right side in FIG. 12) of the insulating cover 80 that is attached to the connection bus bar 60.

As shown in FIG. 8, the gap between the left and right double wall portions 94 has the same width as the width of the aforementioned insulating cover 80 in the front protruding portion 93A, and has the same width as the width of the connection bus bar 60 in the remaining protruding portion, i.e. rear protruding portion 93B, and the body box portion 91.

As shown in FIG. 12, an electrode insertion hole 97, into which the connection electrode 13C of the electric cell 12 can be inserted, is open in a bottom face of the body box portion 91 of the first holding member 90. Positioning holes 98, into which the positioning pins 49 that are arranged standing upright on the first placement portion 47 of the insulating protector 30 are fitted, are formed in a bottom face of each double wall portion 94 of the body box portion 91 (FIG. 8).

An upper edge of the inner wall 95A of one (upper one in FIG. 8) of the double wall portions 94 of the body box portion 91 stays at a position slightly lower than the bottom face of the rear protruding portion 93B, as shown in FIG. 12. An upper edge of the inner wall 95A of the other one (lower one in FIG. 8) of the double wall portions 94 is arranged further downward in order to avoid interference with the welding face 73 of the welding plate 70.

Guide grooves 99, into which the aforementioned guide pieces 76 that are formed to protrude from both side edges of the vertically downward face 72 of the welding plate 70 can be inserted from above, are formed at positions close to the protruding portion 92 of the respective inner walls 95A of the double wall portions 94 of the body box portion 91.

A positioning pin 101 is arranged standing upright in the bottom face of the rear protruding portion 93B, the positioning pin 101 being inserted into the positioning hole 62 that is open in the one end portion 61A of the connection bus bar 60 and the positioning hole 75 that is open in the attachment face 71 of the welding plate 70, as shown in FIG. 12. A pair of elastic locking pieces 102, which are elastically locked to both side edges of the one end portion 61A of the connection bus bar 60 to prevent the connection bus bar 60 from coming out upward, are provided in the opposing faces of the inner walls 95A of the rear protruding portion 93B, as shown in FIG. 8.

Figure 11:
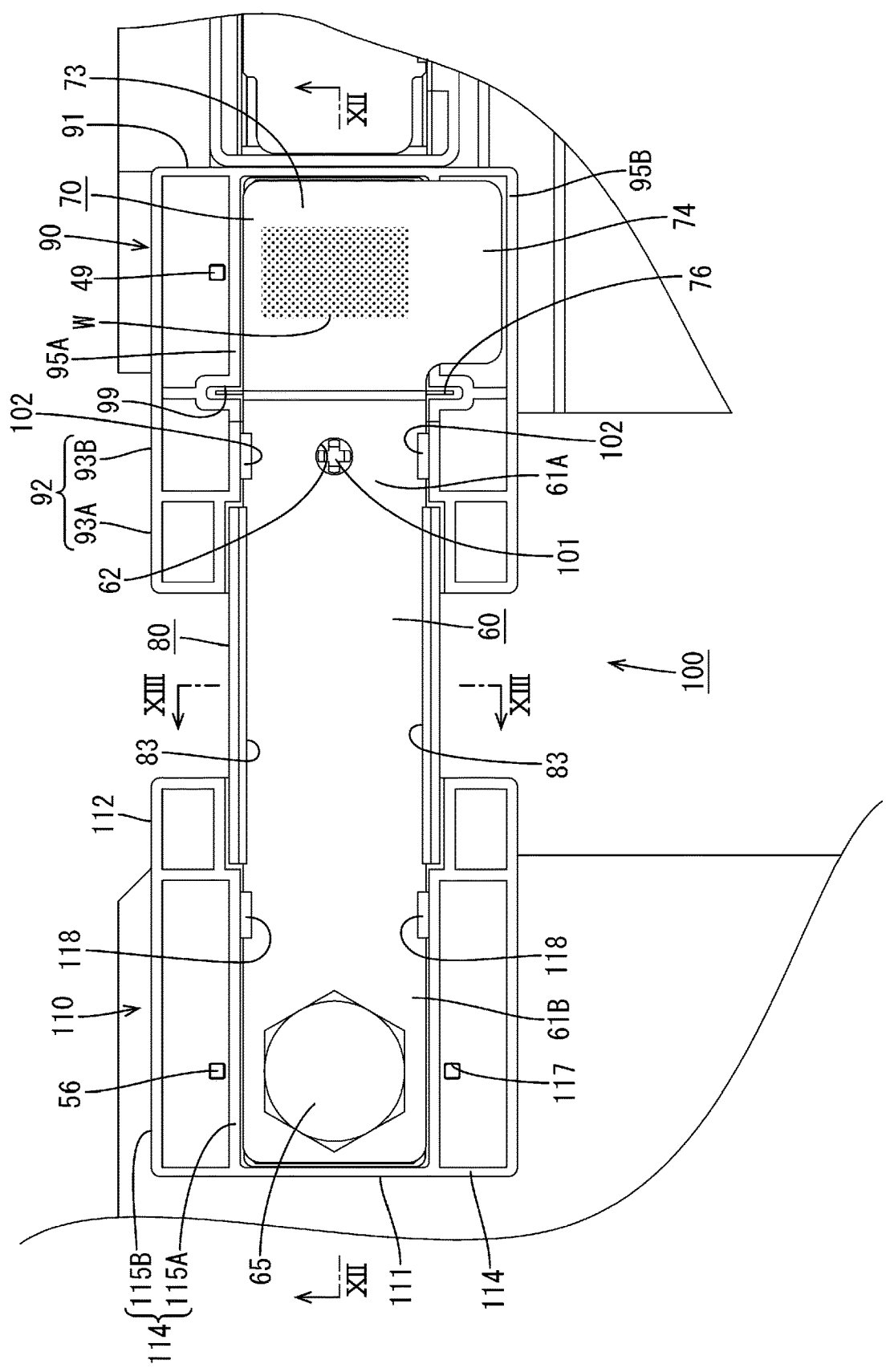
FIG. 11 is a partial enlarged view of FIG. 10.

The second holding member 110 is also made of a synthetic resin, and is formed to have a substantially box shape that is to be placed on the aforementioned second placement portion 51 of the electronic device 50 and is substantially open in its upper face, as shown in FIGS. 11 and 12. Specifically, the second holding member 110 is constituted by a body box portion 111, and a protruding portion 112, which is formed to protrude at an upper position on a face of the body box portion 111 on the side opposing the battery module 10, and left and right side walls of the second holding member 110 are each constituted by a double wall portion 114, which includes an inner wall 115A and an outer wall 115B, as shown in FIG. 12.

A bottom face of the protruding portion 112 is located at a position that is lower than the fastening face 54 of the connecting portion 53 by a predetermined size, and at the same height position as that of the bottom face (first receiving portion 96) of the front protruding portion 93A of the aforementioned first holding member 90. The bottom face of the protruding portion 112 serves as a second receiving portion 113 for receiving the other end portion (left side in FIG. 12) of the insulating cover 80 that is attached to the connection bus bar 60.

As shown in FIG. 11, the gap between the left and right double wall portions 114 has, in the protruding portion 112, the same width as the width of the insulating cover 80, and has, in the body box portion 111, the same width as the connection bus bar 60.

A connecting portion insertion hole 116, into which the connecting portion 53 can be inserted, is open in the bottom face of the body box portion 111 of the second holding member 110 at a position (left side in FIG. 12) close to the rear end of the body box portion 111. Positioning holes 117, into which the positioning pins 56 that are arranged standing upright on the second placement portion 51 are fitted, are formed in the bottom faces of each of the double wall portions 114 of the body box portion 111, as shown in FIG. 11.

A pair of elastic locking pieces 118, which are elastically locked to both side edges of the other end portion 61B of the connection bus bar 60 to prevent the connection bus bar 60 from coming out upward, are provided at positions on the inner walls 115A of the double wall portions 114 of the body box portion 111, the positions being close to the protruding portion 112.

Subsequently, an example of a procedure for connecting the battery module 10 and the electronic device 50 to each other will be described.

In the state shown in FIG. 9, the first holding member 90 for the connection bus bar 60 is attached onto the first placement portion 47 of the insulating protector 30 that constitutes the wiring module 20, and the second holding member 110 is attached to the second placement portion 51 of the electronic device 50.

The first holding member 90 is pushed until it comes into contact with the first placement portion 47, while the positioning holes 98 in the bottom face in the bottom face are aligned with the positioning pins 49. Upon the first holding member 90 being properly placed onto the first placement portion 47, the connection electrode 13C protrudes past the bottom portion of the body box portion 91, through the electrode insertion hole 97, as shown in FIG. 12.

The second holding member 110 is pushed until it comes into contact with the second placement portion 51, while the positioning holes 117 in the bottom face are aligned with the positioning pins 56. Upon the second holding member 110 being properly placed onto the second placement portion 51, the connecting portion 53 protrudes past the body box portion 111 through the connecting portion insertion hole 116.

Figure 13:
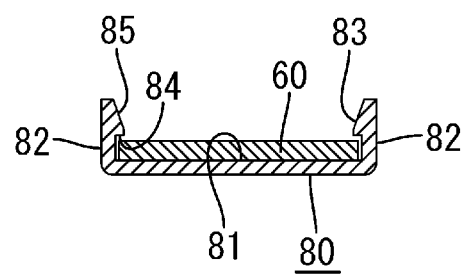
FIG. 13 is an end view taken along a line XIII-XIII in FIG. 11.

Next, the connection bus bar 60 is arranged to span the battery module 10 and the electronic device 50. Before thus arranging the connection bus bar 60, the insulating cover 80 is attached to a predetermined central length region of the lower face of the connection bus bar 60. That is to say, the pawl portions 83 of both side walls 82 are elastically locked to the side edges of the upper face of the connection bus bar 60, in a state where the bottom wall 81 of the insulating cover 80 is in contact with the lower face of the connection bus bar 60 as shown in FIG. 13. As a result, the insulating cover 80 is kept in a state of covering the lower face of the predetermined length region of the connection bus bar 60.

The one end portion 61A (including the welding plate 70) of the connection bus bar 60, to which the insulating cover 80 is attached as mentioned above, is inserted into the first holding member 90 located on the battery module 10 side from above, and simultaneously, the other end portion 61B of the connection bus bar 60 is inserted into the second holding member 110 located on the electronic device 50 side, also from above.

On the first holding member 90 side, as shown in FIGS. 11 and 12, the one end portion 61A of the connection bus bar 60 that is provided with the welding plate 70 is inserted while being positioned with the positioning pins 101 being fitted into the positioning holes 62 and 75. At this time, the one end portion of the insulating cover 80 is accommodated so as to be sandwiched between the opposing inner walls 95A of the front protruding portion 93A. The one end portion 61A of the connection bus bar 60 that is located past the one end portion of the insulating cover 80, and the attachment face 71 of the welding plate 70 that is adhered to the back face of the one end portion 61A are accommodated so as to be sandwiched between the opposing inner faces 95A of the rear protruding portion 93B.

As for the welding plate 70, the welding face 73 is accommodated so as to be sandwiched by the inner wall 95A of one of the double wall portions 94 and the outer wall 95B of the other one of the double wall portions 94, while the guide pieces 76 that are formed to protrude from both side edges of the vertically downward face 72 are guided downward along the guide grooves 99 formed in the opposing inner walls 95A of the body box portion 91.

As shown in FIG. 12, the accommodating operation is finished upon the one end portion of the insulating cover 80 coming into contact with and being received by the first receiving portion 96, which is the bottom face of the front protruding portion 93A, and the welding face 73 of the welding plate 70 also coming into contact with the contact face 14 of the connection electrode 13C. At this time, as shown in FIG. 11, the elastic locking pieces 102 that are provided in the double wall portions 94 of the rear protruding portion 93B are locked to both side edges of the one end portion 61A of the connection bus bar 60, and thus, the connection bus bar 60 is prevented from coming out upward.

On the other hand, the other end portion 61B of the connection bus bar 60 is inserted on the second holding member 110 side. At this time, the other end portion of the insulating cover 80 is accommodated so as to be sandwiched between the opposing inner walls 115A of the protruding portion 112, as shown in FIG. 11. The other end portion 61B of the connection bus bar 60 that is located past the other end portion of the insulating cover 80 is accommodated so as to be sandwiched between the opposing inner walls 115A of the body box portion 111.

As shown in FIG. 12, the accommodating operation is finished upon the other end portion of the insulating cover 80 coming into contact with and being received by the second receiving portion 113, which is the bottom face of the protruding portion 112. Simultaneously, the other end portion 61B of the connection bus bar 60 is placed onto the fastening face 54 of the connecting portion 53 of the electronic device 50, with the bolt insertion hole 66 and the bolt hole 55 being aligned with each other. At this time, as shown in FIG. 11, the elastic locking pieces 118 that are provided in the double wall portions 114 of the body box portion 111 are locked to both side edges of the other end portion 61B of the connection bus bar 60, and thus, the connection bus bar 60 is prevented from coming out upward.

In this state, the bolt 65 is passed through the bolt insertion hole 66 in the other end portion 61B of the connection bus bar 60, and is screwed into the bolt hole 55 in the fastening face 54 of the connecting portion 53. Thus, the other end portion 61B of the connection bus bar 60 is fixed while being pressed against the fastening face 54, as shown in FIG. 12.

On the other hand, on the welding plate 70 side of the one end portion 61A of the connection bus bar 60 in which the welding plate 70 is provided, the pressing portion 74 that is formed protruding from the welding face 73 is held using a jig, and the welding face 73 is brought into close contact with the contact face 14 of the connection electrode 13C. In this state, the welding face 73 is irradiated with a laser using a laser irradiation device (not shown), and thus, the welding face 73 and the contact face 14 are welded to each other by means of laser welding (see welded portion W in FIG. 11). Moreover, the welding plate 70 that is provided at the one end portion 61A of the connection bus bar 60 and the connection electrode 13C are fixed to each other by means of welding.

In this manner, a connection structure is constructed in which the connection electrode 13C of the battery module 10 and the connecting portion 53 of the electronic device 50 are electrically connected to each other using the connection bus bar 60. At this time, the connection bus bar 60, the insulating cover 80, the first holding member 90, and the second holding member 110 constitute the connection apparatus 100 for connecting a battery module and an electronic device.

Here, the insulating cover 80 is attached to the lower face of the connection bus bar 60. Specifically, as shown in FIG. 12, the length region of the connection bus bar 60 that is originally to be exposed between both holding members 90 and 110 is covered and insulated by the insulating cover 80. Accordingly, in the case where a conductive member such as a wire harness or another electronic device is arranged in a space between the battery module 10 and the electronic device 50, i.e. below the connection bus bar 60, a short circuit is prevented from being made between the connection bus bar 60 and the conductive member.

Figure 14:
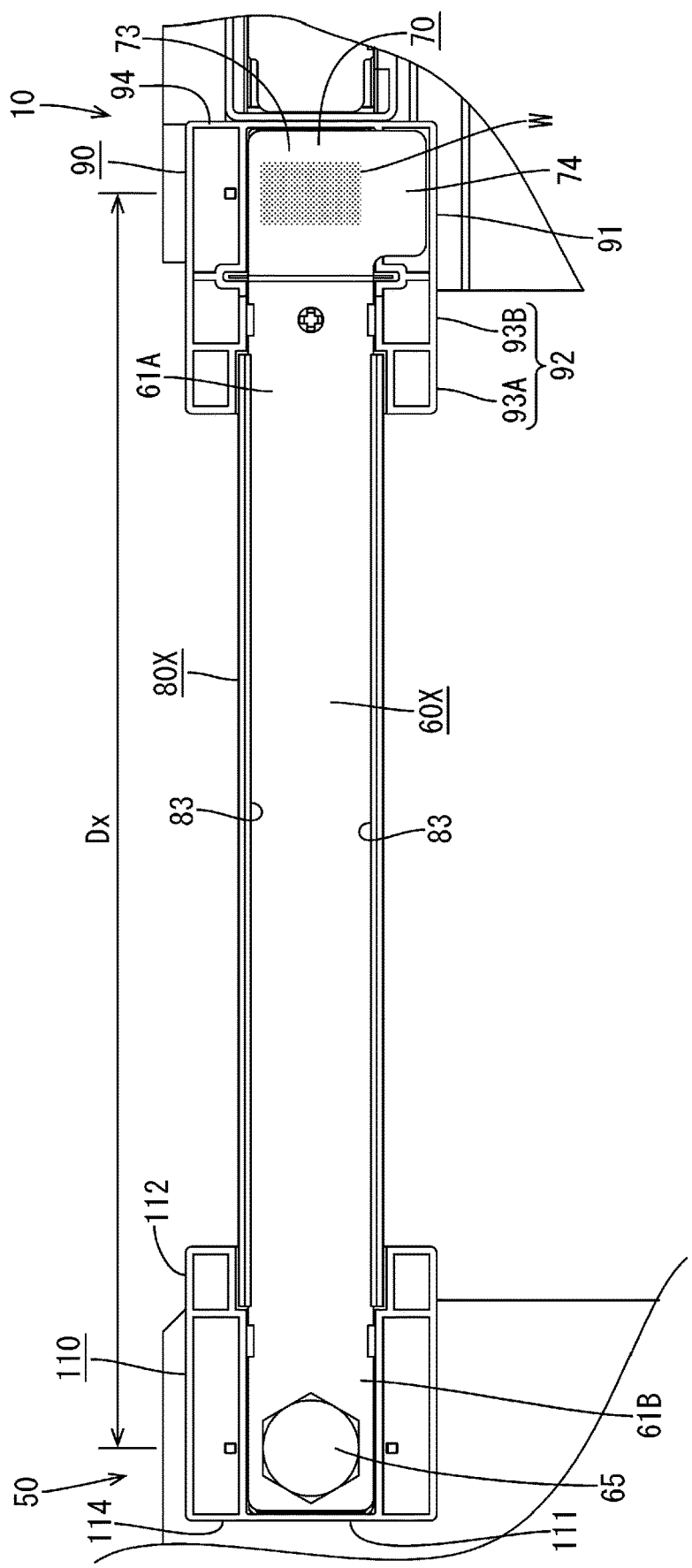
FIG. 14 is a plan view showing a connection state in an example in which the separation distance between the battery module and the electronic device is changed.

Note that, in some cases, the separation distance between the battery module 10 and the electronic device 50 is changed due to, for example, a change in the layout in the vehicle. For example, if a separation distance Dx that is greater than the aforementioned separation distance is employed as shown in FIG. 14, a connection bus bar 60X that has a length that corresponds to the separation distance Dx is provided, as shown in FIG. 15.

Simultaneously, an insulating cover 80X is provided that has another length Lx and can cover the central length region excluding predetermined regions on one end side and the other end side of the aforementioned connection bus bar 60X. The insulating cover 80X is formed by cutting out a piece of elongated extruded material that is formed by extruding a synthetic resin material, into the other length Lx.

After this insulating cover 80X is attached to the predetermined central length region of the lower face of the elongated connection bus bar 60X, the connection bus bar 60X is arranged to span the battery module 10 and the electronic device 50. The welding plate 70 that is provided in the one end portion 61A of the connection bus bar 60X is fixed to the connection electrode 13C of the battery module 10 by means of welding, and the other end portion 61B is fixed to the connecting portion 53 of the electronic device 50 by means of fastening, in the same manner as above. Thus, the battery module 10 and the electronic device 50 are electrically connected to each other.

Since the insulating cover 80X is similarly attached to the lower face of the connection bus bar 60X, and the connection bus bar 60X is insulated thereby, a short circuit is prevented from being made between the connection bus bar 60X and a conductive member arranged below the connection bus bar 60X.

As described above, according to the present embodiment, the insulating cover 80 is attached to the lower face of the connection bus bar 60 that is arranged to span the battery module 10 and the electronic device 50, and the connection bus bar 60 is thus insulated. In the case where a conductive member such as a wire harness or another electronic device is arranged in a space between the battery module 10 and the electronic device 50, i.e. below the connection bus bar 60, a short circuit is prevented from being made between the connection bus bar 60 and this conductive member.

As for the mode of attaching the insulating cover 80 to the connection bus bar 60, the insulating cover 80 is fitted to the lower face of the connection bus bar 60 while both side walls 82 are elastically deformed to assume an open shape, the side walls 82 undergo restoring deformation upon the bottom wall 81 coming into contact with the lower face of the connection bus bar 60, and the pawl portions 83 are locked to the side edges of the upper face of the connection bus bar 60. As a result, the insulating cover 80 is kept in a state of covering the lower face of the connection bus bar 60. When the insulating cover 80 is removed for maintenance or the like, the insulating cover 80 can be removed by opening the side walls 82 against the elastic force thereof to cancel the locking. The insulating cover 80 can be readily attached and detached.

The insulating cover 80 is formed by cutting off a piece of extruded material, which is formed by extruding a synthetic resin material, into a predetermined length. For this reason, insulating covers 80 (80X) of different lengths can be readily manufactured.

For example, if the distance between the battery module 10 and the electronic device 50 is changed, the length of the connection bus bar 60 is also changed accordingly, and then a variety of insulating covers 80 of different lengths are required. The insulating covers 80 of different lengths can be readily provided simply by cutting off a piece of extruded material, as mentioned above.

The connection bus bar 60 is arranged to span the connection electrode 13C in the battery module 10 and the connecting portion 53 of the electronic device 50, with the one end portion 61A including the welding plate 70 and the other end portion 61B to be fastened being accommodated respectively in the first holding member 90 and the second holding member 110 that are insulative. The insulating cover 80 is attached to the lower face of the connection bus bar 60 so as to cover it, with both ends of the insulating cover 80 being received respectively by the receiving portions 96 and 113 of the first holding member 90 and the second holding member 110. The lower face of the insulating cover 80 is then covered over the entire length thereof by the insulating material, and the lower face side is more reliably insulated.

Other Embodiments

The technique disclosed by this specification is not limited to the embodiment described with the above description and the drawings, and for example, the following embodiments are also included in the technical scope.

The insulating cover may also be attached using other means, e.g. the insulating cover may also be adhered to the lower face of the connection bus bar.

The insulating cover may also have another shape that can cover at least the lower face of the connection bus bar, e.g.

the insulating cover may have a flat cylindrical shape (sheath shape) that covers both the upper and lower faces of the connection bus bar.

The insulating cover may also be one that is molded individually for each type with different lengths, which is also encompassed in the technical scope.

The exemplary procedure for connecting the battery module and the electronic device described as an example in the above embodiment is merely an example. Depending on the structure or the like of the insulating cover and the holding members, the connecting procedure can be changed as appropriate, e.g. the insulating cover is attached to the connection bus bar after the connection bus bar is connected so as to span the battery module and the electronic device.

Installing the holding members for holding the connected portions at both ends of the connection bus bar as described as an example in the above embodiment is not essential, and either one or both of them may also be removed.

The means for connecting the one end portion of the connection bus bar to the connection electrode in the battery module is not limited to welding as described as an example in the above embodiment, and other connection means, such as fastening, may also be employed.

The electronic device arranged on the side of the battery module may also be an electronic device other than an inverter, or may also be another battery module.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Battery module
12 Electric cell
13C Connection electrode
50 Electronic device
53 Connecting portion
60, 60X Connection bus bar
61B The other end portion (second connected portion) (of connection bus bar 60)
70 Welding plate (first connected portion)
80, 80X Insulating cover
81 Bottom wall (cover body)
82 Side wall (locking portion)
83 Pawl portion
87 Cut-off portion
90 First holding member (holding member)
96 First receiving portion (receiving portion)
100 Connection apparatus for connecting battery module and electronic device
110 Second holding member (holding member)
113 Second receiving portion (receiving portion)

The invention claimed is:

1. A connection apparatus for connecting a battery module and an electronic device, the connection apparatus being for connecting a battery module in which a plurality of electric cells is arranged in a line and are connected to each other, and an electronic device arranged on a side of the battery module, the connection apparatus comprising:
a connection bus bar in which a first connected portion to be connected to a connection electrode in the battery module is provided at one end, and a second connected portion to be connected to a connecting portion of the electronic device is provided at another end;
an insulating cover that is made of a synthetic resin and is attached to a lower face of the connection bus bar;
a first holding member that is insulative and is attached at a position at which the connection electrode is arranged in the battery module, while holding the first connected portion of the connection bus bar; and
a second holding member that is insulative and is attached at a position at which the connecting portion is arranged in the electronic device, while holding the second connected portion of the connection bus bar,
wherein the first holding member and the second holding member are provided with receiving portions for receiving one end and another end of the insulating cover, respectively,
wherein the insulating cover includes a cover body that comes into contact with the lower face of the connection bus bar, and a locking portion that is provided at a side edge of the cover body so as to be elastically locked to a side edge of the connection bus bar.

2. The connection apparatus for connecting a battery module and an electronic device according to claim 1, wherein cut-off portions are provided at both ends of the insulating cover.

3. A method for manufacturing an insulating cover in a connection apparatus for connecting a battery module and an electronic device, the connection apparatus being for connecting a battery module in which a plurality of electric cells are arranged in a line and are connected to each other, and an electronic device arranged on a side of the battery module, and including a connection bus bar in which a first connected portion to be connected to a connection electrode in the battery module is provided at one end, and a second connected portion to be connected to a connecting portion of the electronic device is provided at another end, an insulating cover that is made of a synthetic resin and is attached to a lower face of the connection bus bar, a first holding member that is insulative and is attached at a position at which the connection electrode is arranged in the battery module while holding the first connected portion of the connection bus bar, and a second holding member that is insulative and is attached at a position at which the connecting portion is arranged in the electronic device while holding the second connected portion of the connection bus bar, wherein the insulating cover includes a cover body that comes into contact with the lower face of the connection bus bar, and a locking portion that is provided at a side edge of the cover body so as to be elastically locked to a side edge of the connection bus bar, the method comprising:

cutting off a piece of extruded material formed by extruding a synthetic resin material into a predetermined length and forming the insulating cover.

\* \* \* \* \*